(12) United States Patent
Koning et al.

(10) Patent No.: US 11,059,451 B2
(45) Date of Patent: Jul. 13, 2021

(54) SEAT BELT RETRACTOR WITH AUXILIARY SPOOL LOCKING SYSTEM

(71) Applicant: AUTOLIV ASP, INC., Ogden, UT (US)

(72) Inventors: Richard W. Koning, Yale, MI (US); Bin Wang, Lake Orion, MI (US); Jon E. Burrow, Ortonville, MI (US); Christopher D. Hall, Clay Township, MI (US); Kenneth Herbert Kohlndorfer, Roseville, MI (US)

(73) Assignee: AUTOLIV ASP, INC., Ogden, UT (US)

(*) Notice: Subject to any disclaimer, the term of this patent is extended or adjusted under 35 U.S.C. 154(b) by 230 days.

(21) Appl. No.: 16/354,844

(22) Filed: Mar. 15, 2019

(65) Prior Publication Data

US 2020/0290561 A1    Sep. 17, 2020

(51) Int. Cl.
*B60R 22/36* (2006.01)
*B60R 22/34* (2006.01)

(52) U.S. Cl.
CPC ........ *B60R 22/3413* (2013.01); *B60R 22/36* (2013.01)

(58) Field of Classification Search
CPC ............................. B60R 22/36; B60R 22/3413
See application file for complete search history.

(56) References Cited

U.S. PATENT DOCUMENTS

| 3,811,703 | A | 5/1974 | Turkovich et al. |
| 4,509,707 | A * | 4/1985 | Ernst ............... B60R 22/36 242/376.1 |
| 5,626,306 | A | 5/1997 | Miller, III et al. |
| 5,735,479 | A | 4/1998 | Takanobu et al. |
| 6,036,274 | A | 3/2000 | Kohlndorfer et al. |
| 6,068,664 | A | 5/2000 | Meyer et al. |
| 6,199,954 | B1 | 3/2001 | Holzapfel |
| 6,561,936 | B1 | 5/2003 | Betz et al. |
| 6,871,877 | B2 | 3/2005 | Herrmann et al. |
| 7,338,083 | B2 | 3/2008 | Sakata |
| 7,364,201 | B2 | 4/2008 | Lutz et al. |
| 7,823,924 | B2 | 11/2010 | Dewey et al. |
| 7,954,854 | B2 | 6/2011 | Keller et al. |
| 9,126,555 | B2 | 9/2015 | Ver Hoven et al. |
| 9,469,272 | B2 | 10/2016 | Kohlndorfer et al. |
| 9,688,237 | B2 | 6/2017 | Ijiri |
| 2011/0174910 | A1* | 7/2011 | Ukita ............... B60R 22/3413 242/379.1 |
| 2012/0049500 | A1 | 3/2012 | Wang et al. |
| 2012/0234958 | A1 | 9/2012 | Stroik, Jr. |

(Continued)

FOREIGN PATENT DOCUMENTS

DE    296 22 038 U1    4/1997
DE    196 48 472 C1    7/1998

*Primary Examiner* — Sang K Kim
(74) *Attorney, Agent, or Firm* — Dickinson Wright PLLC

(57) ABSTRACT

A vehicle seat belt assembly having a seat belt retractor with a spool rotatable with respect to a retractor frame, the spool storing a seat belt webbing wrapped thereon. The retractor also includes a primary locking mechanism for selectively locking the spool with respect to the retractor frame to provide vehicle occupant restraint. The retractor further includes an auxiliary locking mechanism for selectively locking the spool with respect to the retractor frame upon a predetermined restraint load acting on the spool.

17 Claims, 5 Drawing Sheets

(56) References Cited

U.S. PATENT DOCUMENTS

2013/0140390 A1\* 6/2013 Stroik, Jr. .......... A61K 47/6931
  242/379.1
2018/0170305 A1\* 6/2018 Sato .................. B60R 22/36

\* cited by examiner

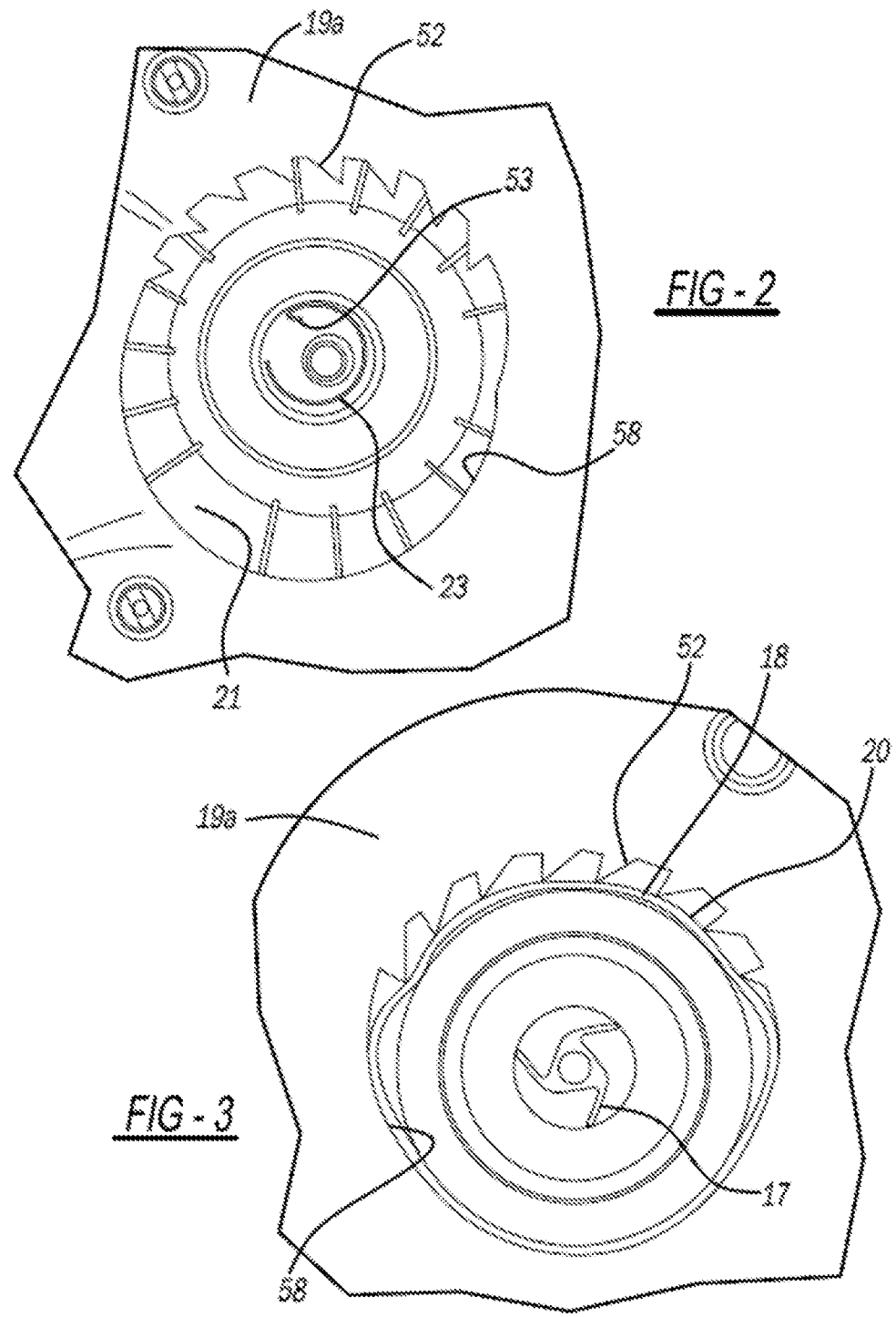

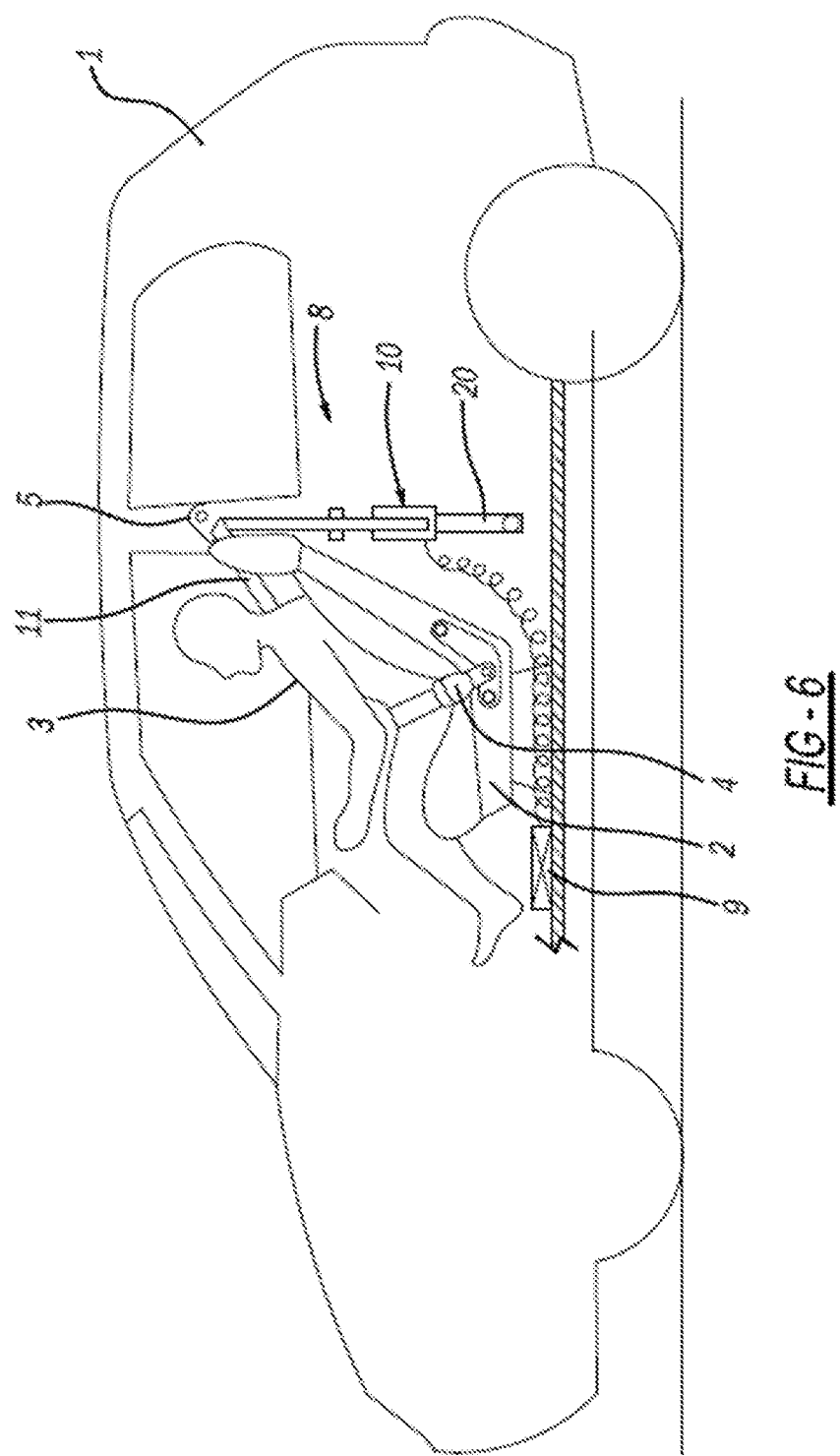

SEAT BELT RETRACTOR WITH AUXILIARY SPOOL LOCKING SYSTEM

FIELD OF THE INVENTION

The present invention relates generally to a seat belt restraint system for restraining an occupant of a vehicle, and more particularly to a seat belt retractor for such a system having a spool, a primary locking system, and an auxiliary locking system.

BACKGROUND OF THE INVENTION

Seat belt retractors are a standard component of vehicle belt restraint systems and have a spool (spindle) for receiving seat belt webbing. The spool is used to wind up and store the webbing. Upon detection of a potential accident situation as indicated by vehicle deceleration or seatbelt webbing extraction, the spool is locked against rotation to restrain the occupant via the seat belt. Recently, retractors have been designed with one or more load limiting elements which are structured to allow the spool to rotate and pay out the seat belt webbing upon reaching predetermined webbing load levels between the occupant and seat belt during a restraint event. In this manner, the restraint force imposed on the occupant can be limited in a controlled manner, providing desired load limitation characteristics.

One or more torsion bars within the spool are commonly used as load limiting elements. In an impact condition, one end of the torsion bar is locked to the retractor frame while the other end is coupled with the retractor spool. The bar section between the attachment points undergoes elastic and plastic torsional deflection, enabling torsion controlled, relative rotation between the spool and the retractor frame. The resulting controlled extraction of webbing during a restraint event serves to limit belt loading acting on the vehicle occupant.

One type of multi-stage load limiting retractor uses a multi-stage torsion bar or a system of torsion bars. The multi-stage torsion bar is essentially two torsion bars that are axially aligned and joined at respective ends. The appropriate stage or portion of the torsion bar may be selectively coupled to provide a secondary load limiting characteristic as desired.

Presently available torsion bar type load limiting retractors generally operate satisfactorily. However, there are additional design goals and objectives desired for further improvement. One such design goal may be to reduce complexity, cost, and/or packaging size. Another such design goal may be to provide a mechanism for improving retractor strength during a restraint event.

BRIEF SUMMARY OF THE INVENTION

The present invention provides a vehicle seat belt assembly having a seat belt retractor with a spool rotatable with respect to a retractor frame, and storing a seat belt webbing wrapped thereon. The retractor also includes a primary locking mechanism for selectively locking the spool with respect to the retractor frame to provide vehicle occupant restraint. The retractor further includes an auxiliary locking mechanism for selectively locking the spool with respect to the retractor frame upon a predetermined restraint load acting on the spool.

Further embodiments of the present invention include the auxiliary locking mechanism having a plurality of locking teeth defining a portion of the retractor frame and an auxiliary locking surface defining a portion of the spool.

Under further embodiments, wherein the spool undergoes radial displacement in response to the predetermined restraint load acting on the spool, thereby permitting engagement between the plurality of locking teeth and the auxiliary locking surface.

Further embodiments of the present invention may include a deformable bearing at least partially positioned between the at least one auxiliary locking tooth and the auxiliary locking surface to substantially prevent engagement between the at least one auxiliary locking tooth and the auxiliary locking surface until the predetermined restraint load acting on the spool. The deformable bearing may also include one or more sidewall substantially perpendicular to the bearing surface and configured to abut one or more walls of the retractor frame. Additionally, the retractor may include more than one deformable bearing.

Further embodiments of the present invention may also include a load limiting element coupled with the spool, wherein the primary locking mechanism selectively locks the spool with respect to the retractor frame at least partially via the load limiting element. The present invention may also include a spool rotation limiter configured to selectively engage at least one of the load limiting element and the spool and selectively restrict relative rotation between the load limiting element and the spool.

BRIEF DESCRIPTION OF THE DRAWINGS

FIG. 2 is a side view of a frame sidewall taken along line 2-2 in FIG. 1, where the deformable bearing and the spool are not shown for illustrative purposes;

FIG. 3 is a side view of a frame sidewall taken along line 3-3 in FIG. 1, where the frame end cap is not shown for illustrative purposes;

FIG. 6 schematically illustrates a seatbelt assembly, in accordance with principles of this invention, utilized in a vehicle.

DETAILED DESCRIPTION OF THE INVENTION

Figure 1:
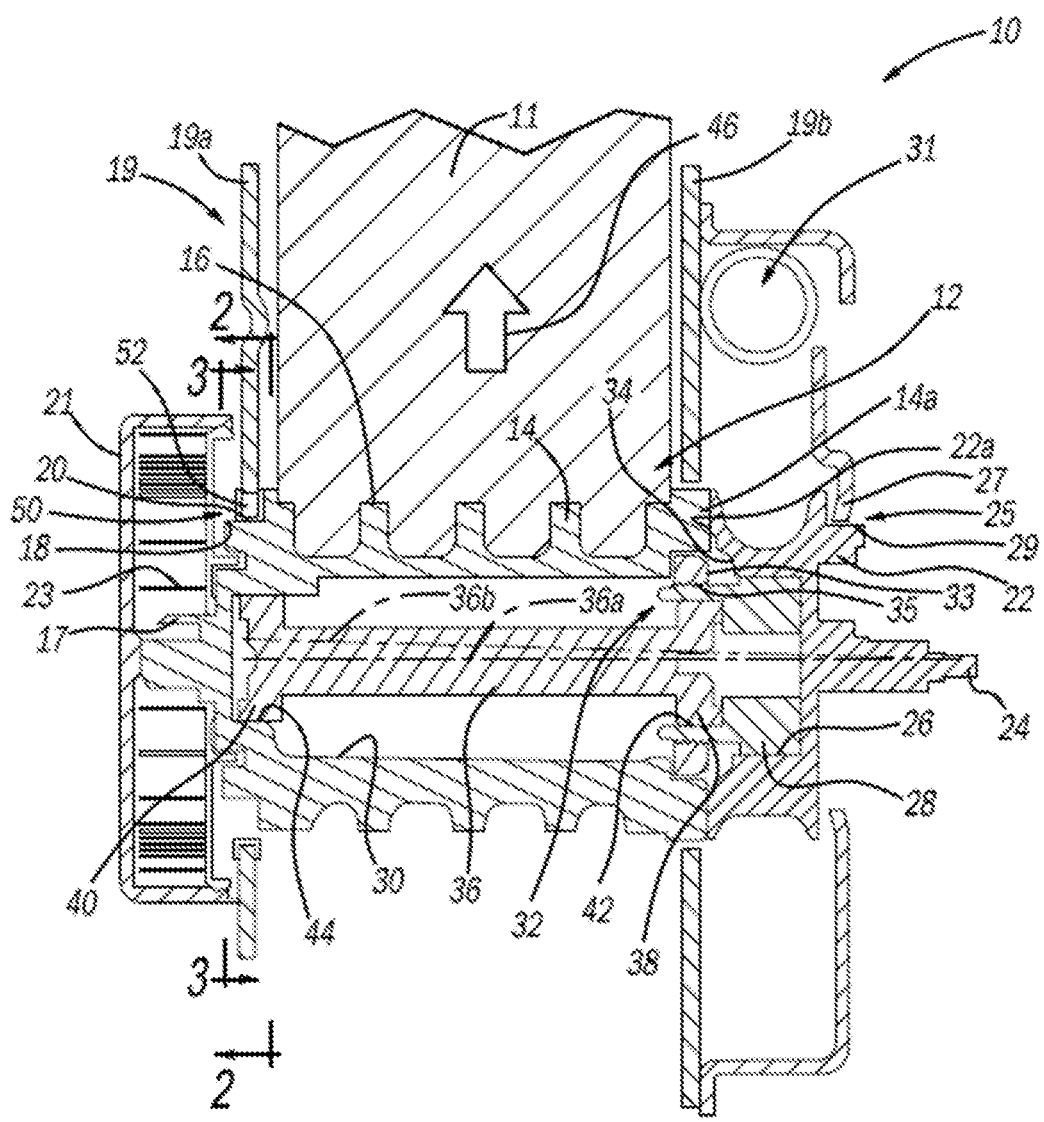
FIG. 1 is a cross-sectional view of a retractor assembly in accordance with the first embodiment of this invention.

With particular reference to FIGS. 1 and 2, retractor assembly 10 in accordance with a first embodiment of this invention is illustrated. The retractor assembly includes generally: a retractor frame 19, a spool assembly 12 with a spool element 14 rotable with respect to the retractor frame 19, a load limiting element such as a torsion bar 36 coupled with the spool element 14, a primary locking mechanism 25 for selectively locking the spool element 14 with respect to the retractor frame 19 via the load limiting element 14, and an auxiliary locking mechanism 50 for selectively locking the spool element 14 with respect to the retractor frame 19.

The spool assembly 12 includes the spool element 14, which forms an outer generally cylindrical surface 16 adapted for engagement with an end of a length of seat belt webbing 11, and enables multiple wraps of the seat belt webbing 11 to be rolled onto and stored on the spool element 14. One end of spool element 14 forms a bearing surface 18 which is held within suitable bushings or bearing elements carried by a retractor frame 19. For example, the retractor frame 19 includes first and second framewalls 19a, 19b and a deformable bearing 20 is positioned between the first framewall 19a and the spool bearing surface 18. A torsion spring cap 21, which is coupled with the first sidewall 19a, houses a retraction spring 23 that engages with retraction teeth 17 of the spool to retract slack from the seat belt webbing 11.

The opposite end of a spool element 14 is coupled with a profile head 22 that includes a bearing stub 24 which is held within suitable bushings or bearing elements directly or indirectly supported by the retractor frame 19. For example, the bearing stub 24 of the profile head 22 may be coupled with a tread head (not shown) that is well known in the art. The surface 14a of the spool element 14 abuts a surface 22a of the profile head 22 with sufficient force and with sufficient respective coefficients of friction that the spool element 14 and the profile head 22 rotate together during certain conditions, such as during all or most periods of non-collision condition operation.

The profile head 22 defines a generally cylindrical shaped bore 26 for receiving a coupler end 28 such that the profile head 22 and the coupler end 28 rotate together. For example, one or both of the bore 26 and coupler end 28 may each include splines that engage each other and prevent slippage or other relatively rotational movement between the respective components. The profile head 22 is in working connection with a primary locking mechanism 25, which restrains rotation of the spool element 14 upon detection of a locking event, as is known in the art. For example, upon detection of a locking event, the primary locking mechanism 25 locks the profile head 22 with respect to the retractor frame side wall 19b, thereby restraining rotation of spool element 14, in a manner to be described below.

The retractor assembly 10 may also include a pretensioner device 31, such as a rotopretensioner device. Rotopretensioner devices are known and may incorporate a series of elements such as ball masses or a polymer rod element (not shown) driven to engage a profile head under gas pressure provided by a gas generator. However, the invention claimed herein may operate with or without a pretensioner device 31.

The retractor assembly 10 shown in the figures also includes a load limiting element, such as a torsion bar 36 with a first end 38 coupled with the profile head 22 via the coupler end 28 and a second end 40 coupled with the spool element 14. The profile head 22, the coupler end 28, the torsion bar 36, and the spool element 14 (at the end 40) may be rotationally fixedly coupled with each other such as to completely or substantially prevent rotational movement at the connection points therebeween. For example, one or both of the first end 38 of the torsion bar 36 and a bore 42 within the and coupler end 28 may each include splines that engage each other and prevent slippage or other relative rotational movement between the respective components. Similarly, one or both of the second end 40 of the torsion bar 36 and a bore 44 within the spool element 14 may each include splines that engage each other and prevent slippage or other relative rotational movement between the respective components. The profile head 22, the coupler end 28, the torsion bar 36, and the bore 44 of the spool element 14 need not include splines to limit rotational movement; on the contrary the components may use any suitable components and/or configuration to limit or prevent the above-described relative rotation movement at the connection points therebetween. The spool load limiting element is not necessary for operation of the invention described herein.

During normal operation, the torsion bar 36 and spool element 14 rotate about a normal operation central axis 36a. However, under certain conditions discussed in more detail below, the spool element 14 and/or the torsion bar 36 may undergo radial displacement such that they rotate about a displaced central axis 36b. In other words, due to restraint loads reaching a predetermined level, the spool element 14 longitudinal axis becomes displaced or skewed from its normal position.

The retractor assembly 10 may also include a spool rotation limiter 32 configured to selectively engage the torsion bar 36 and/or the spool element 14 to selectively prevent relative rotation between the torsion bar 36 and the spool element 14. For example, after a predetermined number of turns (full or partial) between the torsion bar 36 first end 38 and second ends 40, the spool rotation limiter 32 will lock the spool element 14 to the profile head 22 and prevent further rotation of the torsion bar 36. As a more specific example, the spool rotation limiter 32 shown in FIG. 1 includes a threaded nut 33 that is threadedly-coupled with a threaded portion 35 of the coupler end 28. Upon rotational deformation of the torsion bar 36 (when the second end 40 rotates with respect to the first end 38), the spool element 14 rotates with respect to the coupler end 28 and the threaded nut 33 travels along the threaded portion 35 of the coupler end towards a profile head wall 34. After a certain number of rotations, determined by the thread pitch and the length of the threaded portion, the threaded nut 33 engages the profile head wall 34 and locks or substantially locks the spool element 14 and the profile head 22, thereby preventing further rotation of the torsion bar 36. The spool rotation limiter 32 is not necessary for operation of the invention described herein.

The retractor assembly 10 may also include an auxiliary locking mechanism 50 for selectively locking the spool element 14 with respect to the retractor frame 19 upon a a predetermined restraint load acting on the spool. For example, the auxiliary locking mechanism 50 shown in FIGS. 1-3 includes at least one auxiliary locking tooth for selectively engaging an auxiliary locking surface to restrain relative movement between the frame and the spool. As a more specific example, the auxiliary locking mechanism 50 shown in FIGS. 1-3 includes a plurality of auxiliary locking teeth 52 that selectively engage an outside cylindrical surface of the spool element 14, namely auxiliary locking surface 18, upon reaching the predetermined restraint load acting on the spool. The auxiliary locking mechanism 50 shown in FIGS. 1-3 also includes the deformable bearing 20 positioned between the auxiliary locking surface 18 of the spool element 14 and the auxiliary locking teeth 52 to prevent engagement between the auxiliary locking surface 18 and the auxiliary locking teeth 52 while the deformable bearing 20 is intact (i.e., before the reaching the predetermined restraint load). In other words, when the deformable bearing 20 remains intact and in position, it generally prevents contact between the auxiliary locking surface 18 of the spool element 14 and the auxiliary locking teeth 52, thereby allowing the spool element 14 to rotate within bearing surface 21a without the auxiliary locking teeth 52 engaging or directly contacting the spool element 14.

The above-referenced predetermined restraint load acting on the spool may be at least partially facilitated by engagement of the spool rotation limiter 32 locking the spool element 14 and the profile head 22. For example, upon engagement of the spool rotation limiter 32, the restraint load acting on the spool element 14 may increase to the point that the predetermined restraint load is reached. Additionally, when the predetermined restraint load is reached, the spool element 14 may be radially displaced, as discussed above.

During normal vehicle operation, in which the profile head 22 is not locked, spool assembly 12 is permitted to freely rotate with respect to the retractor frame 19 about bearing 18 and bearing stub 24. For example, belt webbing 11 may be protracted from the retractor (typically by a vehicle occupant) in the direction 46 shown in FIG. 1 or retracted (typically by the retractor spring 23) in the opposite direction. This operation permits certain types of movement of the vehicle occupant during normal operating conditions, providing desirable comfort and convenience features.

During a locking event, the spool assembly 12 is generally restricted or prevented from seat belt 11 extraction in the direction 46. For example, the profile head 22 is locked with respect to the retractor frame 19 to restrict seatbelt webbing 11 extraction.

In one type of locking event, a routine locking event, the seat belt webbing 11 extraction speed or extraction acceleration may fall outside prescribed limits, thereby indicating that the occupant is extracting webbing faster relative to the seat than a predetermined amount or the vehicle inertia sensing locking device is activated due to vehicle inclination, road induced vibrations etc. In a routine locking event, the profile head 22 is locked to the retractor frame 19 via a primary locking mechanism 25 until the retractor assembly 10 is reset. For example, the primary locking mechanism 25 may include locking teeth 27 that, during a locking event, engage with a receiving surface 29 of the profile head 22 and lock the profile head 22 with respect to the frame 19. As a result, the spool assembly 12 may become locked with respect to the frame 19 via two main types of connections. For example, on one hand, the spool assembly 12 is locked with respect to the frame 19 via the fixed connection of the profile head 22 with the coupler end 28, the fixed connection of the coupler end 28 with the torsion bar first end 38, and the fixed connection of the torsion bar second end 40 and the spool element 14. On the other hand, the spool assembly 12 is also locked with respect to the frame 19 via frictional forces such as press-fit engagement or other abutting engagement between the abutting surfaces 14*a* and 22*a* of the spool element 14 and the profile head 22, respectively. When the spool assembly 12 is locked with respect to the frame 19, the vehicle occupant's momentum or other forces may create seatbelt load forces in the direction 46. However, during routine locking events, these seatbelt load forces are typically low enough such that the abutting surfaces 14*a* and 22*a* remain engaged without rotational, relative slippage between each other.

After a routine locking event, the spool assembly 12 typically or often remains locked with respect to the frame 19 until the retractor assembly 10 is reset, such as by the occupant allowing the seat belt webbing 11 to retract a predetermined distance and/or by unbuckling (when vehicle conditions safely allow) and allowing the retractor spring 23 to return the seat belt webbing 11 to the its retracted position. In this type of routine locking event, the pretensioner device 31 is not activated.

In another type of locking event, a collision condition locking event, the associated vehicle may undergo inertial loads or webbing extraction speeds outside prescribed limits, thereby indicating a vehicle crash or a potential vehicle crash. The associated vehicle and/or components of the retractor assembly 10 may be able to distinguish a routine locking event and a collision condition locking event via a number of mechanical, electrical, or other components, sensors, or systems. For example, the associated vehicle and/or components of the retractor assembly 10 may include an inertia sensitive locking system that detects inertia changes to the vehicle and/or components of the retractor assembly 10. As a more specific example, the associated vehicle may include vehicle-mounted collision sensor 9 (FIG. 6) that detect when the vehicle decelerates with a force equal to a predetermined amount, such as a force that generally corresponds to moderate to severe crashes.

During a collision condition locking event, the retractor assembly 10 typically operates generally similarly as it does during a routine locking event, with five main potential differences: (1) activation of the pretensioner, (2) rotational slippage between the abutting surfaces 14*a* and 22*a* of the spool element 14 and the profile head 22, (3) deformation of the torsion bar 36, (4) engagement of the spool rotation limiter 32, and (5) engagement of the auxiliary locking mechanism 50.

Regarding the first potential characteristic of a collision condition, in the event that a collision condition is detected, the pretensioner device 31 may be activated by sending a firing signal to an associated gas generator, thereby retracting a length of seat belt webbing 11 and tightening the seat belt against the vehicle occupant. The rotopretensioner may include a mechanism to lock the profile head 22 after undergoing pretensioning rotation.

In addition to such pretensioner locking, or independent of it, profile head 22 is locked in response to inertial loadings acting on the vehicle. For example, the primary locking mechanism 25 locking teeth 27 engage with the profile head 22 receiving surface 29 and lock the profile head 22 with respect to the frame 19. As a result, the spool assembly 12 is locked with respect to the frame 19 via the fixed connection of the profile head 22 with the coupler end 28, the fixed connection of the coupler end 28 with the torsion bar first end 38, and the fixed connection of the torsion bar second end 40 and the spool element 14. When the spool assembly 12 is locked with respect to the frame 19, the vehicle occupant's momentum or other restraint forces may create seatbelt load forces in the direction 46. The primary locking mechanism may also utilize the tread head (not shown) and/or pawls (not shown) for locking the profile head 22 to the retractor frame 19. A tread head and pawls are well known in the art.

Regarding the second and third potential characteristics of a collision condition, the forces associated with the collision condition locking event may allow relative rotation between the abutting surfaces 14*a* and 22*a* of the profile head 22 and the spool element 14. As a result, most or all of the restraint forces acting in the direction 46 act upon the torsion bar 36, potentially causing deflection and/or deformation of the same. As discussed above, one end 38 of the torsion bar 36 is locked to the retractor frame 19 (via the profile head 22 and the coupler end 28) while the other end 40 is coupled with the spool element 14. The torsion bar 36 section between the attachment points (38, 40) undergoes elastic and plastic torsional deflection, enabling torsion controlled, relative rotation between the spool element 14 and the retractor frame 19. In other words, torsion bar 36 may undergo elastic (initially) and plastic torsional deformation, thereby allowing controlled extraction (protraction) of the belt webbing 11 while limiting belt loads. The force flow in such conditions may be from the seat belt webbing 11, to spool element 14, to torsion bar 36, to the coupler end 28, to the profile head 22, to the primary locking mechanism 25, to the frame 19. The characteristics of torsion bar 36 are designed to provide predetermined load limiting characteristics. Several turns (full or partial) of relative rotation between torsion bar heads 38 and 40 may occur. The load limiting characteristics may be beneficial to limit forces from the seat belt webbing 11 acting on the vehicle occupant.

Regarding the fourth potential characteristic of a collision condition, the spool rotation limiter shown in FIG. 1 limits the spool rotation during a collision condition. For example, although it may be desirable for the torsion bar 36 to act as a load limiter, it may also be desirable to limit the seat belt webbing 11 extraction. As a more specific example, it may be desirable to limit the seat belt webbing 11 extraction after a predetermined number of relative rotations between torsion bar heads 38 and 40. For example, referring to FIG. 1, as the torsion bar 36 undergoes torsional deformation, the threaded nut 33 travels along the threaded portion 35 of the coupler end 28 towards the profile head wall 34. After a certain number of rotations, determined by the thread pitch and the length of the threaded portion, the threaded nut 33 engages the profile head wall 34 and locks or substantially locks the spool element 14 and the profile head 22, thereby preventing further rotation of the torsion bar 36.

Regarding the fifth potential characteristic of a collision condition, the auxiliary locking mechanism 50 shown in FIGS. 1-3 selectively locks the spool element 14 with respect to the retractor frame 19 upon the predetermined restraint load acting on the spool. For example, the auxiliary locking mechanism 50 shown in FIGS. 1-3 includes a plurality of auxiliary locking teeth 52 defining a portion of the framewall 19*a* that selectively engage the auxiliary locking surface 18 defining a portion of the spool element 14. The auxiliary locking mechanism 50 shown in FIGS. 1-3 also includes the deformable bearing 20 positioned between the auxiliary locking surface 18 and the auxiliary locking teeth 52 to prevent engagement while the deformable bearing 20 is intact (i.e., before the predetermined restraint load). In other words, when the deformable bearing 20 remains intact and in position, it prevents contact between the auxiliary locking surface 18 of the spool element 14 and the auxiliary locking teeth 52, thereby allowing the spool element 14 to rotate within bearing surface 21 without the auxiliary locking teeth 52 engaging or directly contacting the spool element 14. However, upon the predetermined restraint load, the auxiliary locking teeth 52 break, deform, or displace the deformable bearing 20 and directly engage the auxiliary locking surface 18.

The auxiliary locking mechanism 50 may be advantageous for a variety of reasons. For example, although it may be desirable for the torsion bar 36 to act as a load limiter, it may also be desirable to define an outer limit of seat belt webbing 11 extraction permitted during a crash event. As another example, the auxiliary locking mechanism 50 may provide increased retractor assembly 10 strength during a collision condition by providing an additional point of contact between the spool element 14 and the frame 19 and by providing a locking point on the opposite side of the seat belt webbing 11 than the primary locking mechanism 25.

Upon reaching the predetermined restraint load, forces in the direction 46 may cause the spool element 14 and/or the torsion bar 36 to be radially displaced such that the auxiliary locking surface 18 of the spool element 14 presses upwardly on the deformable bearing 20, into the auxiliary locking teeth 52, with forces sufficient to break or displace or deform the deformable bearing 20 and to permit direct contact between the auxiliary locking surface 18 of the spool element 14 and the auxiliary locking teeth 52. Upon contact between the auxiliary locking surface 18 and the auxiliary locking teeth 52, the spool element 14 becomes substantially or completely locked to the frame wall 19*a* and substantially or completely prevents rotation of the spool element 14. For example, the relatively sharp auxiliary locking teeth 52, coupled with the collision forces in the direction 46, cause the auxiliary locking teeth 52 to dig into the auxiliary locking surface 18 and substantially or completely prevent further seat belt webbing 11 extraction.

FIG. 2 shows a view of the frame sidewall 19*a* taken along line 2-2 in FIG. 1, with portions of the torsion spring cap 21 and the retractor spring 23 visible through an opening 58 in the frame sidewall 19*a*. For illustrative purposes, the deformable bearing 20 and the spool element 14 are not shown in FIG. 2.

FIG. 3 shows a view of the frame sidewall 19*a* taken along line 3-3 in FIG. 1, with the auxiliary locking surface 18 of the spool element 14 extending through the opening 58 in the frame sidewall 19*a* and the deformable bearing 20 positioned between the auxiliary locking surface 18 and the auxiliary locking teeth 52. FIG. 3 shows the retraction teeth 17 that engage with the retraction spring 23 (FIGS. 1, 2) to retract slack from the seat belt webbing 11. For example, as shown in FIG. 2, the retraction spring 23 includes a bent end 53 for selectively engaging any one of the retraction teeth 17 (FIG. 3).

Many different design parameters have the ability to affect the conditions in which the auxiliary locking mechanism 50 is engaged. For example, the thickness, material properties, surface smoothness and polish, manufacturing techniques, and other design parameters of the deformable bearing 20 may affect the conditions under which the auxiliary locking teeth 52 are able to directly engage the auxiliary locking surface, i.e. bearing 18. As another example, the size, shape, sharpness, and material properties of the auxiliary locking teeth 52 may affect: (1) the collision forces and other conditions under which the deformable bearing 20 is caused to break and/or deform; (2) the time elapsed and the seatbelt webbing paid-out between the moment of direct contact between the auxiliary locking teeth 52 and the auxiliary locking surface 18 and the moment when the frame 19 and the spool element 14 are substantially or completely locked via the auxiliary locking mechanism 50; (3) the extent to which metal is removed from or deformed on the auxiliary locking surface 18 when the auxiliary locking mechanism 50 is engaged; (4) the mechanism for unlocking or releasing the retractor assembly 10 after engagement of the auxiliary locking mechanism 50. As yet another example, the material properties, surface smoothness and polish, manufacturing techniques, and other design parameters for the bearing surface are able to affect at least performance variables (2), (3), and (4) in the prior sentence.

Figure 4:
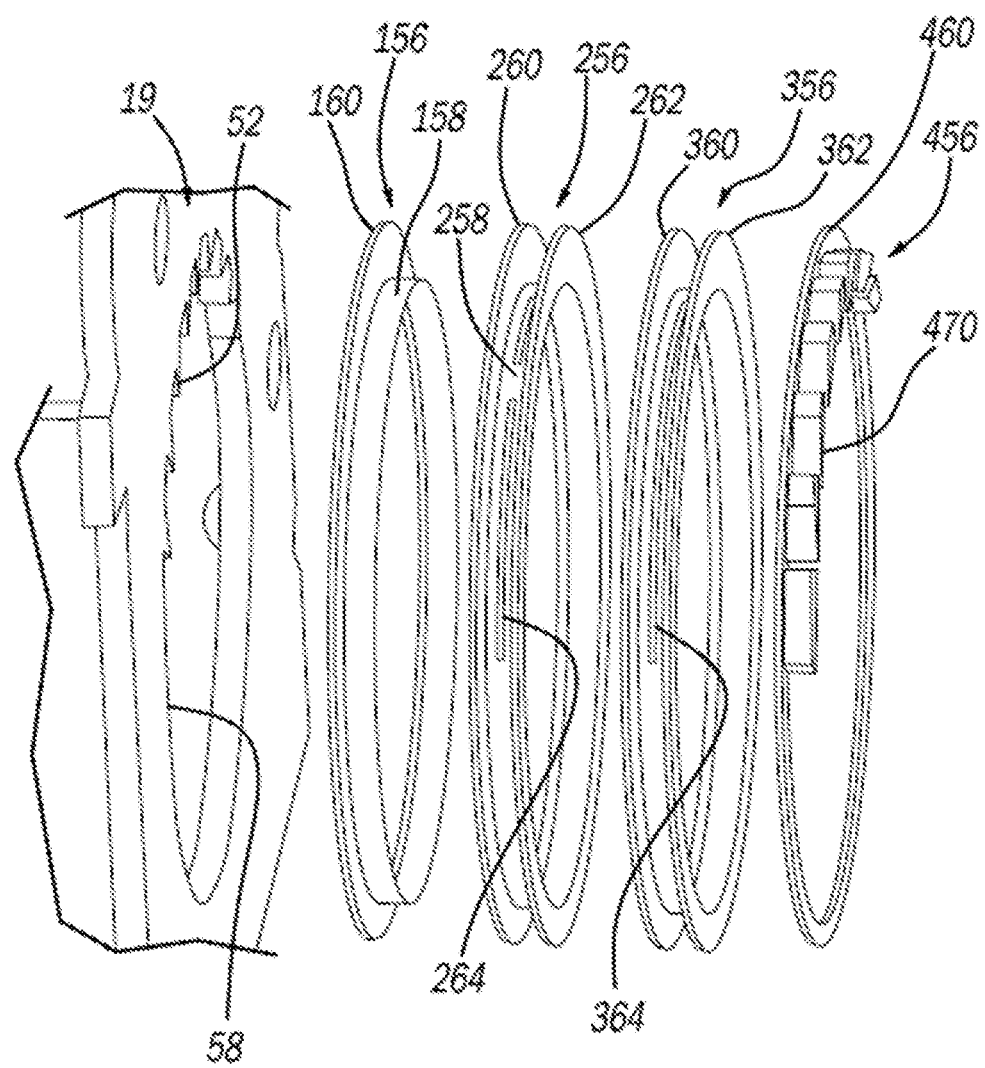
FIG. 4 is an exploded view of second, third, fourth, and fifth embodiments of deformable bearings in relation to a frame sidewall.
Figure 5A:
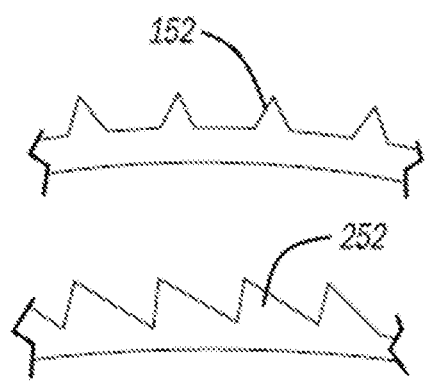
FIGS. 5a, 5b, 5c, and 5d show various embodiments of frame teeth.
Figure 5B:
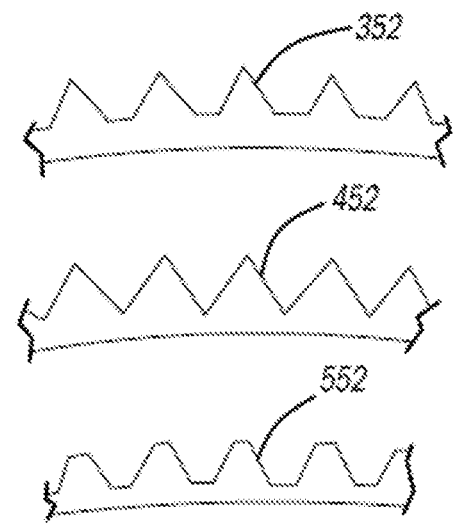
Figure 5C:
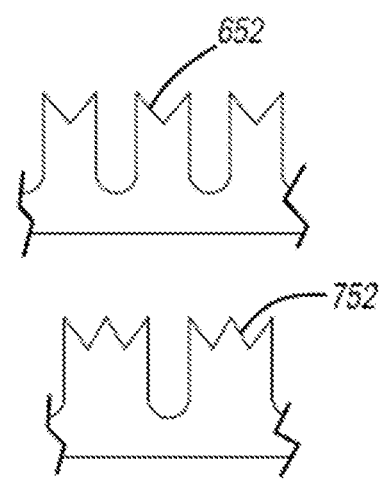
Figure 5D:
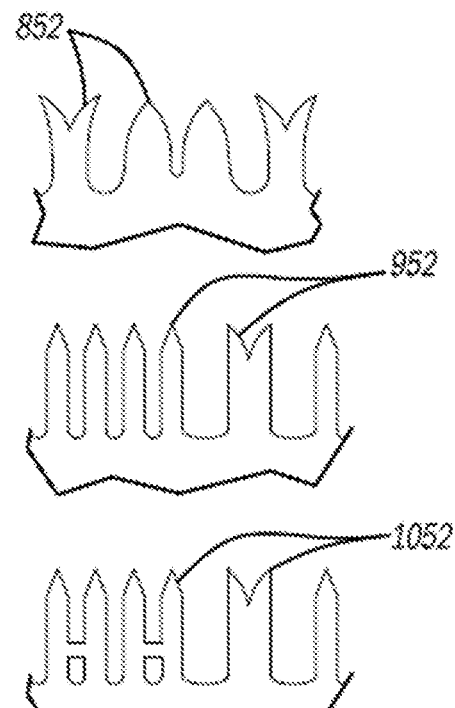

FIG. 4 shows four additional embodiments of deformable bearings that are suitable with the auxiliary locking mechanism 50. For example the second deformable bearing 156 is similar to the deformable bearing 20 shown in FIGS. 1-3 but it has a sidewall 160 to keep the deformable bearing 156 in position between the frame 19 and the auxiliary locking surface 18 (not shown in FIG. 4). During engagement of the auxiliary locking mechanism 50, the sidewall 160 may remain intact even if the bearing surface 158 of the deformable bearing 156 becomes deformed or broken.

As another example in FIG. 4, the third deformable bearing 256 includes two sidewalls 260, 262 to keep the deformable bearing 256 in position between the frame 19 and the auxiliary locking surface 18 (not shown in FIG. 4). More specifically, each sidewall 260, 262 is positioned on opposite walls of the frame wall 19*a*. During engagement of the auxiliary locking mechanism 50, the sidewalls 260, 262 may remain intact even if the bearing surface 158 of the deformable bearing 156 becomes deformed or broken. The third deformable bearing 256 may also include slits 264 that help facilitate engagement of the auxiliary locking mechanism 50 under collision conditions. More specifically, under certain collision conditions, the auxiliary locking teeth 52 are able to break through the slits 264 to promote engagement between the auxiliary locking teeth 52 and the auxiliary locking surface 18 because the slits 264 may act as a starting point for deformation or breakage of the bearing surface 258. The slits 264 are typically thinner than the thickness of the auxiliary locking teeth 52 to reduce the likelihood that the auxiliary locking teeth 52 extend through the bearing surface 258 during non-collision conditions.

As another example in FIG. 4, the fourth deformable bearing 356 includes two sidewalls 360, 362 to keep the deformable bearing 356 in position between the frame 19 and the auxiliary locking surface 18 (not shown in FIG. 4). The fourth deformable bearing 356 may also include indentations 364 that help facilitate engagement of the auxiliary locking mechanism 50 under collision conditions. More specifically, the indentations 364 do not extend through the entire thickness of the bearing surface 358, unlike the slits 264 in the third deformable bearing 256, but they still affect the conditions under which the auxiliary locking teeth 52 are able to break through the bearing surface 358.

As another example in FIG. 4, the fifth deformable bearing 456 includes a sidewall 460 to keep the deformable bearing 456 in position between the frame 19 and the auxiliary locking surface 18 (not shown in FIG. 4). The fifth deformable bearing 456 may also include teeth covers 470 that correspond to the shapes and sizes of the auxiliary locking teeth 52. For example, each of the eight teeth covers 470 corresponds to a surface defining one of the eight teeth 52 such that when the fifth deformable bearing 456 is in position the teeth 52 and teeth covers 470 cooperate to define a relatively smooth surface around the opening 58. Upon engagement of the auxiliary locking mechanism 50, the teeth covers 470 are each likely deformed or broken away from the sidewall 460.

It is notable that one or more of the deformable bearings (56, 156, 256, 356, 456) may be used in conjunction with each other. For example, the deformable bearing 20 may be used together with the fifth deformable bearing 456 such that the deformable bearing 20 creates a smooth, uninterrupted surface for engagement with auxiliary locking surface 18 and such that the fifth deformable bearing 456 is able to reduce or prevent pressure points between the moving components.

FIGS. 5a, 5b, 5c, and 5d show various embodiments of frame teeth 152, 252, 352, 452, 552, 652, 752, 852, 952, 1052. The frame teeth shown in the Figures herein are each designed to minimize the engagement between the frame teeth and the spool auxiliary locking surface 18 until the auxiliary locking mechanism 50 is engaged. As discussed above, the size, shape, sharpness, and material properties of the auxiliary locking teeth 52 are able to affect many performance variables. For example, frame teeth 152 have a smaller profile than the auxiliary locking teeth 52 shown in FIGS. 1-4, thereby potentially leading to an increased time elapsed and the seatbelt webbing paid-out between the moment of direct contact between the frame teeth 152 and the auxiliary locking surface 18 and the moment when the frame 19 and the spool element 14 are substantially or completely locked via the auxiliary locking mechanism 50. As another example, frame teeth 252 are angled away from the direction of rotation, unlike the auxiliary locking teeth 52, thereby also potentially leading to an increased time elapsed and seatbelt webbing paid-out and also potentially making it easier to unlock or release the retractor assembly 10 after engagement of the auxiliary locking mechanism 50 because the frame teeth 252 may take longer to dig into the material of the auxiliary locking surface 18. As yet another example, frame teeth 452 each have a top edge that is not perpendicular to the frame sidewall 19a, thereby potentially leading to a decreased time elapsed and seatbelt webbing paid-out the fire and potentially increasing the extent to which metal is removed from or deformed on the auxiliary locking surface 18 when the auxiliary locking mechanism 50 is engaged. As another example, the frame teeth 752, 852, 952, 1052 may have irregular or varying teeth profiles.

FIG. 6 schematically illustrates a seatbelt assembly 8 utilized in a vehicle 1, such as a motor vehicle. The vehicle 1 includes a seat 2 mounted to the vehicle that is able to support a occupant 3. The seatbelt assembly 8 includes the retractor assembly 10 mounted to the vehicle 1, the pretensioner assembly 31 mounted to the retractor assembly 10 or the vehicle 1, the seatbelt webbing 11 stored on the on the spool of the retractor assembly 10, a buckle 4 having a female portion mounted to the seat 3 or the vehicle 1 and able to receive the buckle male portion coupled with one end of the seatbelt webbing 11, and an anchor 5 mounted to the vehicle 1 and supporting the seatbelt webbing 11 near the shoulder area of the occupant 3. The vehicle 1 illustrated in FIG. 6 also includes the collision sensor 9 that detects inertia changes to the vehicle 1.

The invention described therein may be utilized with a vehicle, such as an automobile, other ground-based transportation, airplane, other air-based transportation, or any other vehicle suitable for transporting people or objects that are preferably secured during transportation and/or during a collision.

Additional refinements of the retractor assembly 10 may be implemented in connection with this invention. In other words, while the above description constitutes the preferred embodiment of the present invention, it will be appreciated that the invention is susceptible to modification, variation and change without departing from the proper scope and fair meaning of the accompanying claims.

What is claimed is:

1. A vehicle seat belt retractor comprising:
    a spool rotatable with respect to a retractor frame, the spool storing a seat belt webbing wrapped thereon;
    a primary locking mechanism for selectively locking the spool with respect to the retractor frame to provide vehicle occupant restraint; and
    an auxiliary locking mechanism for selectively locking the spool with respect to the retractor frame upon a predetermined restraint load acting on the spool, wherein the predetermined restraint load causes the spool to undergo a radial displacement of the longitudinal axis of the spool, causing an engagement between an auxiliary locking tooth defined by a portion of the retractor frame and an auxiliary locking surface defined by a portion of the spool.

2. The vehicle seat belt retractor in accordance with claim 1, wherein the auxiliary locking mechanism restrains relative movement between the retractor frame and the spool.

3. The vehicle seat belt retractor in accordance with claim 2, further comprising a load limiting element coupled with the spool, wherein the primary locking mechanism selectively locks the spool with respect to the retractor frame at least partially via the load limiting element.

4. The vehicle seat belt retractor in accordance with claim 3, further comprising a spool rotation limiter configured to selectively engage at least one of the load limiting element and the spool and selectively restrict relative rotation between the load limiting element and the spool.

5. A vehicle seat belt retractor comprising:
- a spool rotatable with respect to a retractor frame, the spool storing a seat belt webbing wrapped thereon wherein the spool undergoes a radial displacement upon the predetermined restraint load acting on the spool;
- a primary locking mechanism for selectively locking the spool with respect to the retractor frame to provide vehicle occupant restraint; and
- an auxiliary locking mechanism for selectively locking the spool with respect to the retractor frame upon a predetermined restraint load acting on the spool,
- further comprising a deformable bearing at least partially positioned between the at least one auxiliary locking tooth and the auxiliary locking surface to substantially prevent engagement between the at least one auxiliary locking tooth and the auxiliary locking surface in the absence of the predetermined restraint load acting on the spool.

6. The vehicle seat belt retractor in accordance with claim 5, wherein the deformable bearing includes a generally disc shaped bearing surface positioned between the at least one auxiliary locking tooth and the auxiliary locking surface.

7. The vehicle seat belt retractor in accordance with claim 6, wherein the deformable bearing further includes at least one sidewall substantially perpendicular to the bearing surface and configured to abut a wall of the retractor frame.

8. The vehicle seat belt retractor in accordance with claim 6, further comprising a second deformable bearing at least partially positioned between the at least one auxiliary locking tooth and the auxiliary locking surface.

9. The vehicle seat belt retractor in accordance with claim 5, wherein the at least one auxiliary locking tooth includes a plurality of auxiliary locking teeth and the deformable bearing includes a plurality of teeth covers that each correspond to a shape and size of the plurality of auxiliary locking teeth.

10. A vehicle seat belt retractor comprising:
- a spool rotatable with respect to a retractor frame, the spool storing a seat belt webbing wrapped thereon;
- a load limiting element coupled with the spool;
- a primary locking mechanism for selectively locking the spool with respect to the retractor frame, at least partially via the load limiting element, to provide vehicle occupant restraint; and
- an auxiliary locking mechanism for selectively locking the spool with respect to the retractor frame upon a predetermined restraint load acting on the spool, wherein the predetermined restraint load causes the spool to undergo a radial displacement of the longitudinal axis of the spool, causing an engagement between an auxiliary locking tooth defined by a portion of the retractor frame and an auxiliary locking surface defined by a portion of the spool.

11. A vehicle seat belt retractor comprising:
- a spool rotatable with respect to a retractor frame, the spool storing a seat belt webbing wrapped thereon;
- a load limiting element coupled with the spool;
- a primary locking mechanism for selectively locking the spool with respect to the retractor frame, at least partially via the load limiting element, to provide vehicle occupant restraint; and
- an auxiliary locking mechanism for selectively locking the spool with respect to the retractor frame upon a predetermined restraint load acting on the spool, wherein the auxiliary locking mechanism includes a portion of the retractor frame defining at least one auxiliary locking tooth and a portion of the spool defining an auxiliary locking surface,
- further comprising a deformable bearing at least partially positioned between the at least one auxiliary locking tooth and the auxiliary locking surface to substantially prevent engagement between the at least one auxiliary locking tooth and the auxiliary locking surface in the absence of the predetermined restraint load acting on the spool.

12. The vehicle seat belt retractor in accordance with claim 11, wherein the deformable bearing includes a generally disc shaped bearing surface positioned between the at least one auxiliary locking tooth and the auxiliary locking surface.

13. The vehicle seat belt retractor in accordance with claim 12, wherein the deformable bearing further includes at least one sidewall substantially perpendicular to the bearing surface and configured to abut a wall of the retractor frame.

14. The vehicle seat belt retractor in accordance with claim 13, further comprising a second deformable bearing at least partially positioned between the at least one auxiliary locking tooth and the auxiliary locking surface.

15. The vehicle seat belt retractor in accordance with claim 11, wherein the at least one auxiliary locking tooth includes a plurality of auxiliary locking teeth and the deformable bearing includes a plurality of teeth covers that each correspond to a shape and size of the plurality of auxiliary locking teeth.

16. A seat belt assembly for a vehicle comprising:
- a retractor assembly including:
- a retractor frame;
- a spool rotatable with respect to the retractor frame, the spool storing a seat belt webbing wrapped thereon;
- a primary locking mechanism for selectively locking the spool with respect to the retractor frame, to provide vehicle occupant restraint; and
- an auxiliary locking mechanism for selectively locking the spool with respect to the retractor frame upon a predetermined restraint load acting on the spool, wherein the predetermined restraint load causes the spool to undergo a radial displacement of the longitudinal axis of the spool, causing an engagement between an auxiliary locking tooth defined by a portion of the retractor frame and an auxiliary locking surface defined by a portion of the spool; and
- a buckle having a female portion connected to the vehicle and a male portion coupled with one end of the seat belt webbing and configured to selectively couple the seat belt webbing to the vehicle via the male and female portions of the buckle.

17. A seat belt assembly comprising:
- a retractor assembly including:
- a retractor frame;
- a spool rotatable with respect to the retractor frame, the spool storing a seat belt webbing wrapped thereon;
- a primary locking mechanism for selectively locking the spool with respect to the retractor frame, to provide vehicle occupant restraint; and
- an auxiliary locking mechanism for selectively locking the spool with respect to the retractor frame upon a predetermined restraint load acting on the spool; and a buckle having a female portion connected to the vehicle and a male portion coupled with one end of the seat belt webbing and configured to selectively couple the seat belt webbing to the vehicle via the male and female portions of the buckle, wherein the auxiliary locking mechanism includes a portion of the retractor frame defining at least one auxiliary locking tooth, a portion of the spool defining an auxiliary locking surface, and a deformable bearing at least partially positioned between the at least one auxiliary locking tooth and the auxiliary locking surface to substantially prevent engagement between the at least one auxiliary locking tooth and the auxiliary locking surface in the absence of the predetermined restraint load acting on the spool.

* * * * *